United States Patent
Landau et al.

(10) Patent No.: US 10,121,010 B2
(45) Date of Patent: Nov. 6, 2018

(54) SYSTEM AND METHOD FOR PREVENTING EXECUTION OF MALICIOUS INSTRUCTIONS STORED IN MEMORY AND MALICIOUS THREADS WITHIN AN OPERATING SYSTEM OF A COMPUTING DEVICE

(71) Applicant: Endgame, Inc., Atlanta, GA (US)

(72) Inventors: Gabriel D. Landau, Glen Burnie, MD (US); Nicholas Eli Fritts, Annapolis, MD (US)

(73) Assignee: Endgame, Inc., Arlington, VA (US)

( * ) Notice: Subject to any disclaimer, the term of this patent is extended or adjusted under 35 U.S.C. 154(b) by 274 days.

(21) Appl. No.: 15/153,629

(22) Filed: May 12, 2016

(65) Prior Publication Data
US 2017/0329973 A1    Nov. 16, 2017

(51) Int. Cl.
*G06F 21/57* (2013.01)
*G06F 21/55* (2013.01)
*G06F 21/56* (2013.01)

(52) U.S. Cl.
CPC ............ *G06F 21/577* (2013.01); *G06F 21/55* (2013.01); *G06F 21/56* (2013.01)

(58) Field of Classification Search
CPC ............................ H04L 9/3247; G06F 21/577
USPC ............................................ 380/200; 726/25
See application file for complete search history.

(56) References Cited

U.S. PATENT DOCUMENTS

| | | | |
|---|---|---|---|
| 8,239,688 B2 * | 8/2012 | De Atley | G06F 21/51 709/219 |
| 2013/0174257 A1 * | 7/2013 | Zhou | H04L 63/1416 726/23 |
| 2016/0117229 A1 | 4/2016 | Epstein | |

* cited by examiner

*Primary Examiner* — Dant B Shaifer Harriman
(74) *Attorney, Agent, or Firm* — DLA Piper LLP (US)

(57) ABSTRACT

In one embodiment, a malicious code prevention module identifies potentially malicious instructions in volatile memory of a computing device and replaces them with innocuous instructions. In another embodiment, the malicious code prevention module identifies a potentially malicious thread within an operating system and replaces the first instruction in the thread with a new instruction that terminates the thread. Malicious code prevention module prevents malicious code from inflicting any harm on the computing device and its contents.

9 Claims, 8 Drawing Sheets

SYSTEM AND METHOD FOR PREVENTING EXECUTION OF MALICIOUS INSTRUCTIONS STORED IN MEMORY AND MALICIOUS THREADS WITHIN AN OPERATING SYSTEM OF A COMPUTING DEVICE

FIELD OF THE DISCLOSURE

The present disclosure relates to a system and method for preventing the execution of malicious instructions stored in memory of a computing device and the execution of malicious threads within an operating system of the computing device. The embodiments can prevent harm to the computing device and its contents and to other devices connected to the computing device and the content contained on those devices.

BACKGROUND

As computing devices become increasingly complex, viruses and malware also are becoming increasingly complex and difficult to detect and prevent. While the prior art includes many approaches for scanning non-volatile storage such as a hard disk drive for such threats, the prior art includes few satisfactory solutions for detecting malicious code loaded into memory or the processor itself. The prior art also is lacking in the ability to detect malicious instructions before they are executed, particularly in situations where the malicious instructions are "new" and not part of a well-known virus or malware.

FIG. 1 depicts an exemplary prior art computing device 100 comprising processor 110, memory 120, and storage device 130. In this example, memory 120 is volatile and can comprise DRAM, SRAM, SDRAM, or other known memory devices, and storage device 130 is non-volatile and can comprise a hard disk drive, solid state drive, flash memory, or other known storage devices. One of ordinary skill in the art will understand that processor 110 can include a single processor core or multiple processor cores as well as numerous cache memories, as is known in the prior art.

In FIG. 2, data is stored on storage device 130. There are numerous mechanisms to store data on storage device 130, and two known mechanisms are shown for illustration purposes. In one mechanism, data is stored as blocks 220 and can be accessed by logical block address (LBA) or similar addressing scheme. In another mechanism, data is stored as files 230 and can be accessed using a file system. In the prior art, scanning module 210 can be executed by processor 110 and can scan either blocks 220 or files 230 to look for malicious code. This often is referred to as virus scan software and is well-suited for identifying and nullifying known malicious programs that are stored in non-volatile devices such as in storage device 130.

While prior art techniques are well-suited for detecting known malicious programs in non-volatile devices, there is no satisfactory technique for detecting malicious instructions in processor 110 or memory 120 when the malicious instructions are not also stored in storage device 130. There also is no satisfactory technique for detecting unknown malicious instructions (e.g., newly introduced viruses) whether stored in storage device 130 or not.

What is needed is a mechanism for detecting malicious instructions in processor 110 and memory 120 and preventing their execution. What is further needed is a mechanism for preventing the execution of unknown malicious instructions, whether stored on storage device 130 or not.

Another aspect of the prior art is shown in FIG. 5. Processor 110 runs operating system 310. Operating system 310 comprises scheduler 510. Operating system 310 is capable of operating multiple threads at once (such as threads 520, 530, and 540), where each thread is a set of code that forms a process or related processes. Scheduler 510 determines which threads to run and it follows various algorithms to determine when to start and stop a particular thread. The prior art lacks a technique for identifying a malicious thread and terminating the execution of such thread.

Therefore, what is further needed is a mechanism for preventing the execution of malicious instructions within a thread in an operating system.

BRIEF SUMMARY OF THE INVENTION

In one embodiment, a malicious code prevention module identifies potentially malicious instructions in volatile memory of a computing device and replaces them with innocuous instructions. In another embodiment, the malicious code prevention module identifies a potentially malicious thread within an operating system and replaces the first instruction in the thread with a new instruction that terminates the thread. Malicious code prevention module prevents malicious code from inflicting any harm on the computing device and its contents.

DETAILED DESCRIPTION OF PREFERRED EMBODIMENTS

Figure 1:
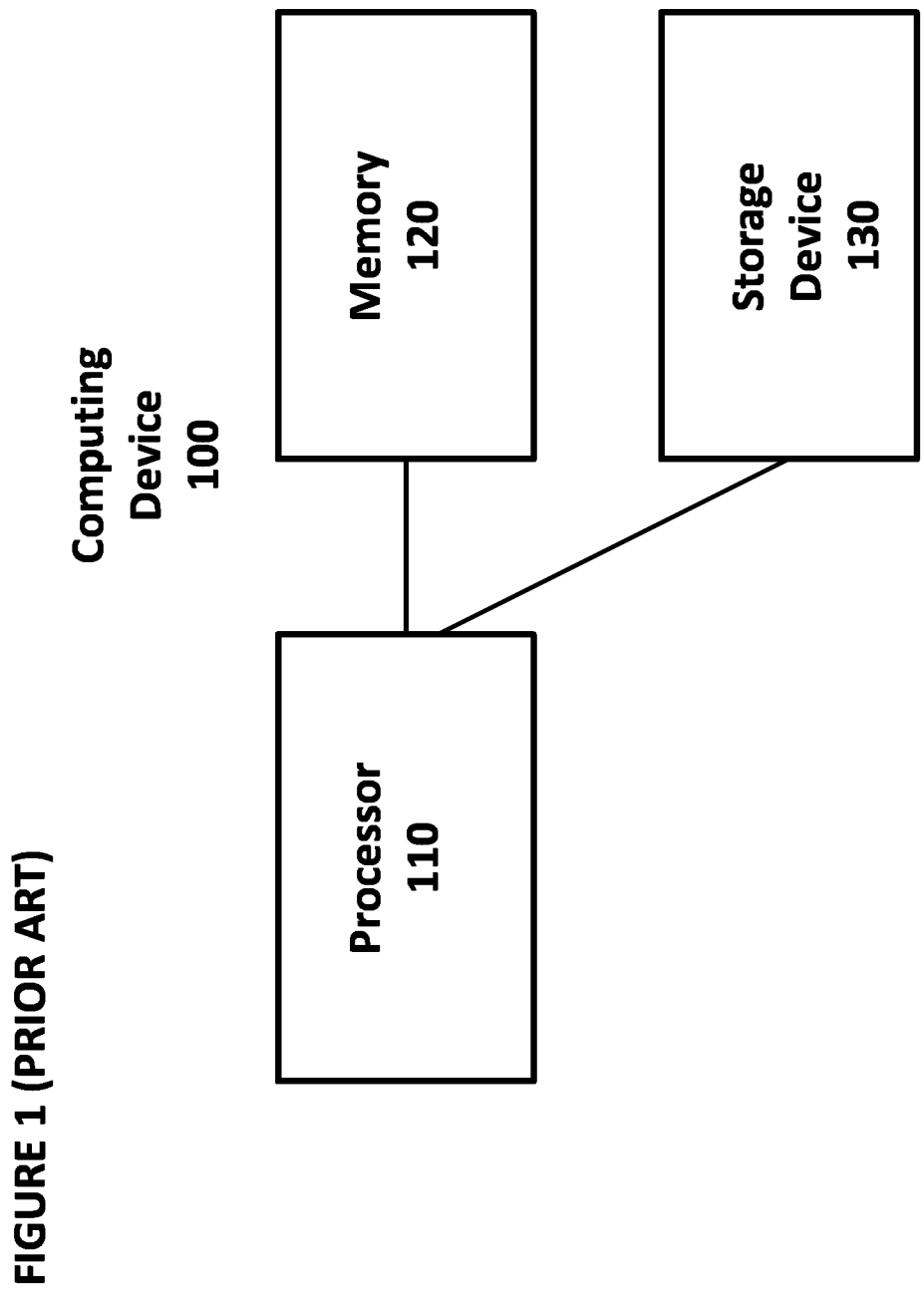
FIG. 1 depicts a prior art computing device.
Figure 2:
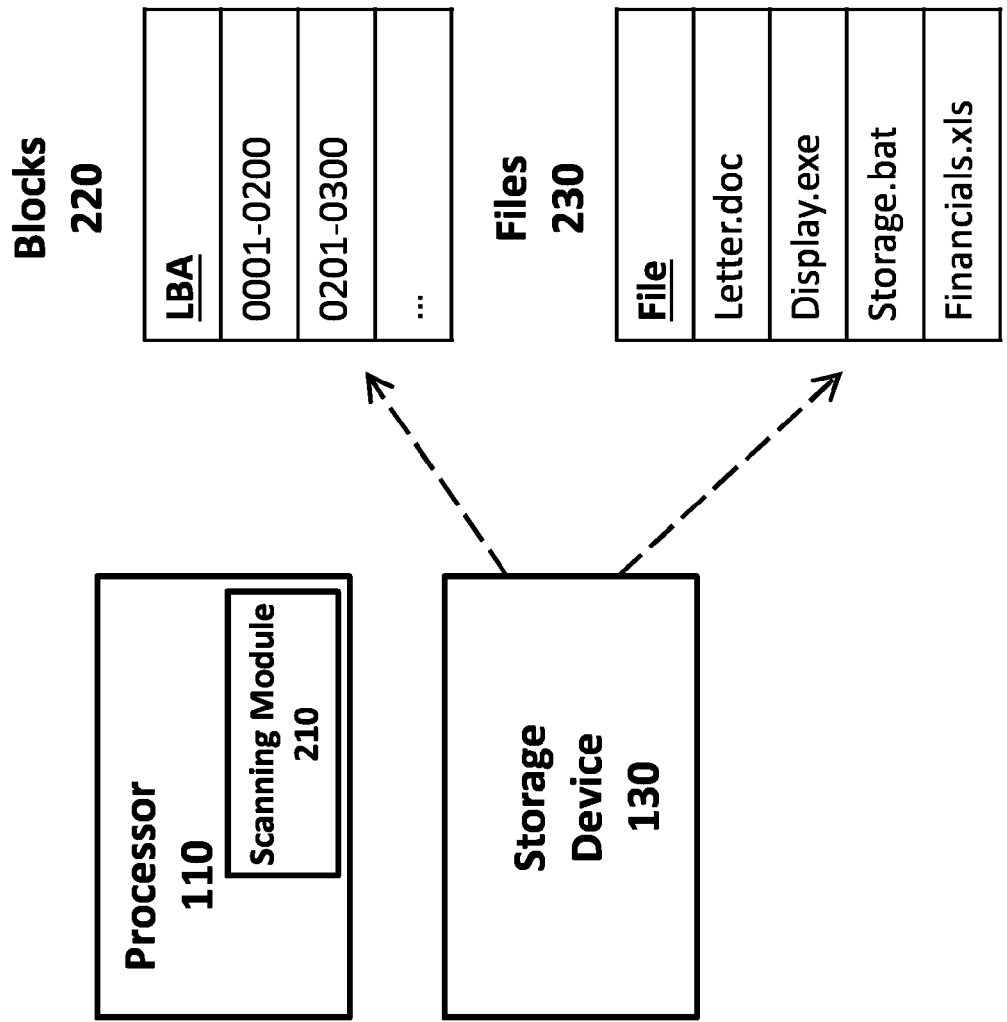
FIG. 2 depicts prior art virus scan software.
Figure 3:
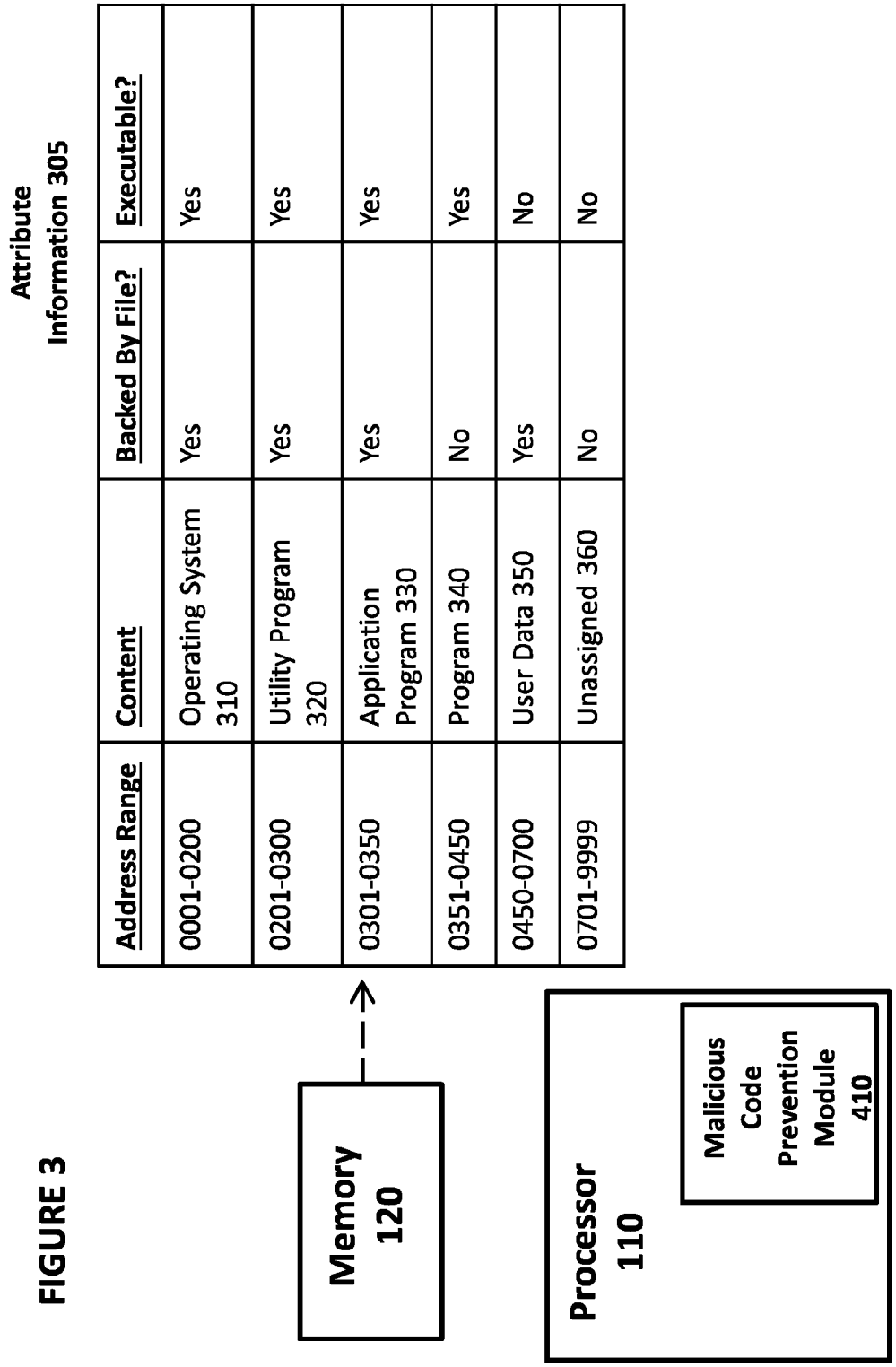
FIG. 3 depicts a malicious code prevention module identifying potentially malicious instructions.

FIG. 3 depicts one embodiment of the invention. The address space within memory 120 is assigned to various programs and processes by operating system 310. In this example, various address ranges have been assigned to operating system 310 itself, utility program 320, application program 330, program 340, and user data 350, with an area 360 remaining unassigned. In this example, operating system 310 makes available attribute information 305 about each program or process through an API (application programming interface) or other means. Attribute information 305 includes information indicating whether the program or process is backed by a file (which means it is associated with a file stored in storage device 130) and is executable (which means that it comprises instructions that can be executed by processor 110).

Programs or processes that are not backed by a file and that are executable are potentially malicious. Programs or processes that are not backed by a file are able to evade prior art virus scan software. Moreover, most malicious entities are intended to be executed by processor 110.

Figure 4:
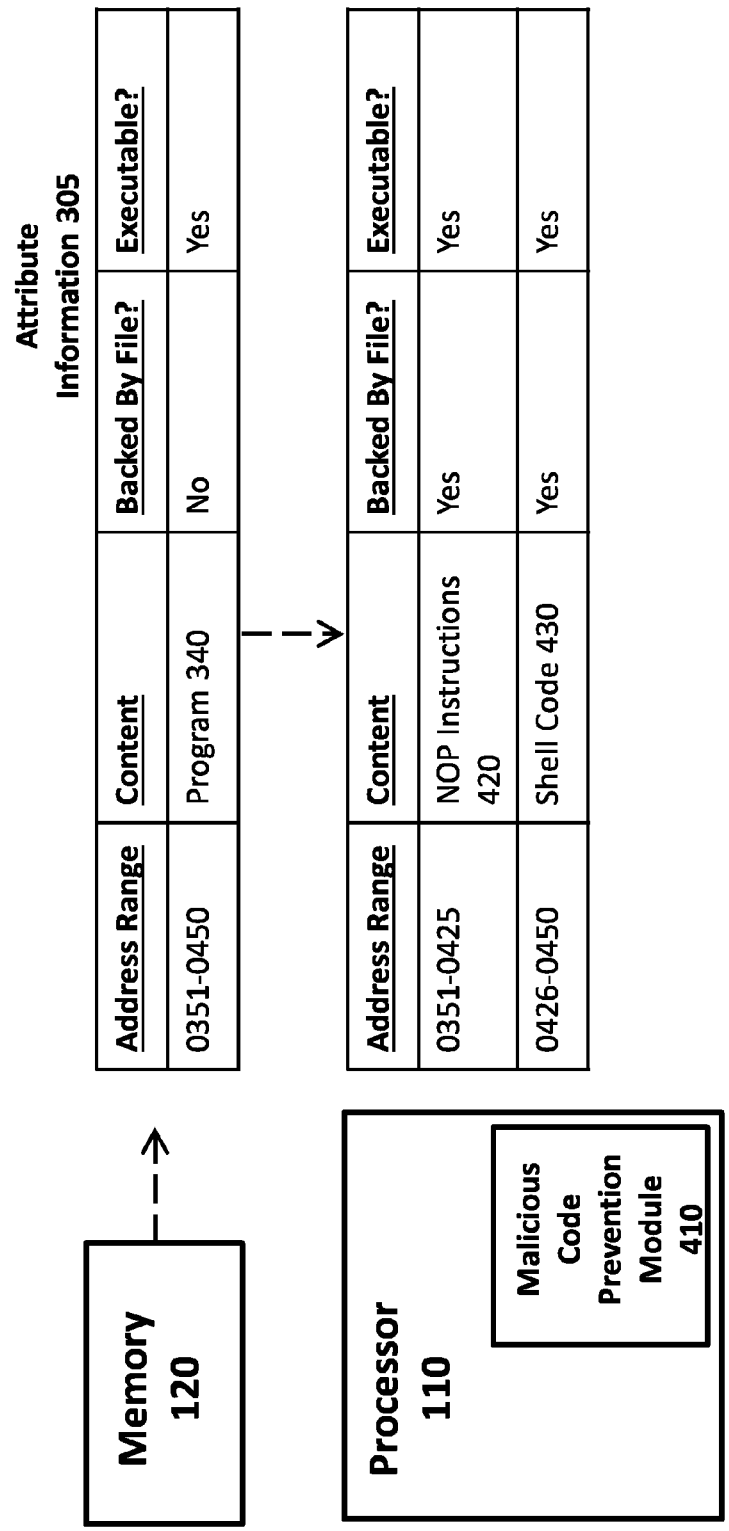
FIG. 4 depicts the malicious code prevention module replacing potentially malicious instructions with innocuous instructions.
Figure 5:
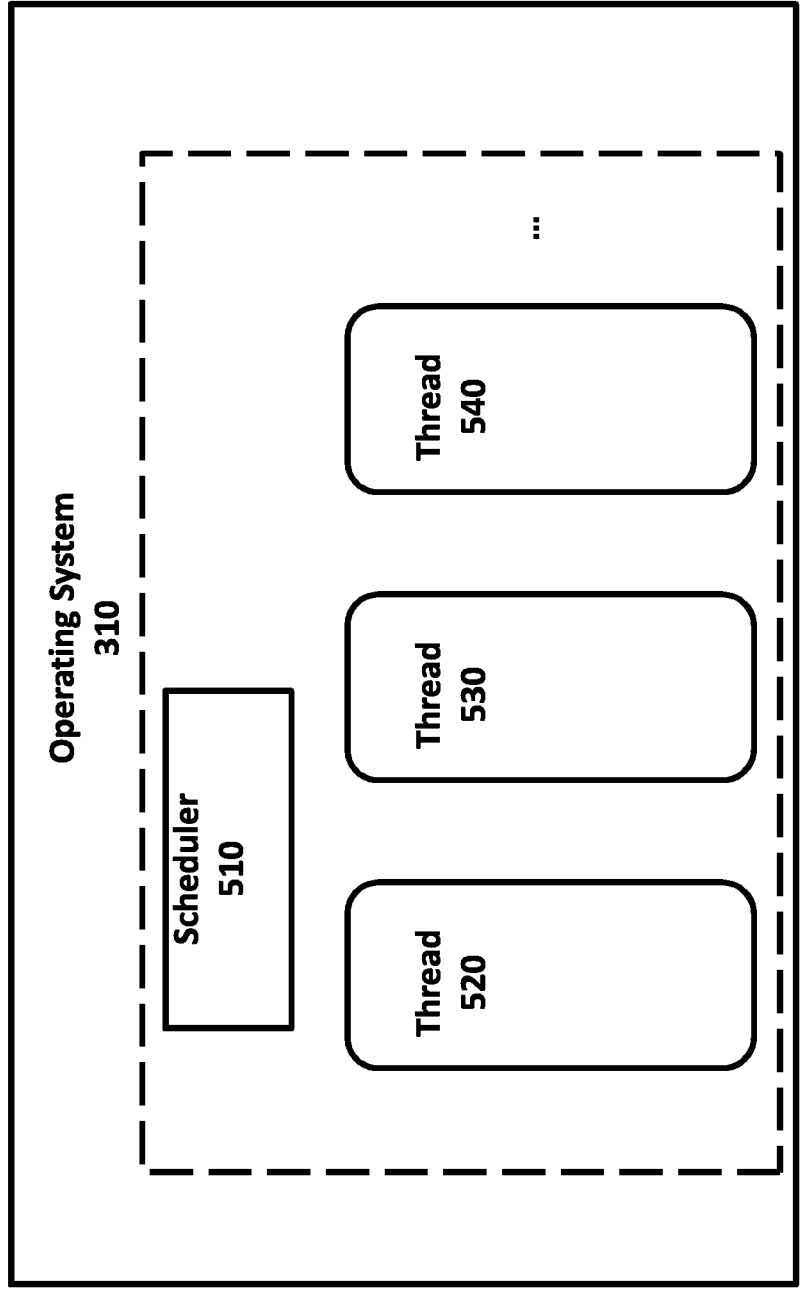
FIG. 5 depicts a prior art multi-threaded operating system.

In FIG. 4, malicious code prevention module 410 identifies program 340 as not backed by a file and executable using attribute information 305. Malicious code prevention module 410 then replaces program 340 with one or more NOP (No Operation) instructions 420 and shell code 430. The NOP instructions 420 are essentially instructions that do nothing, and shell code 430 is code that returns processor 110 and operating system 310 to a safe state. Thus, malicious code prevention module 410 prevents program 340 from being executed. In situations where program 340 is in fact malicious, malicious code prevention module 410 will prevent the malicious code from inflicting any further harm on computing device 100 and its contents.

Figure 6:
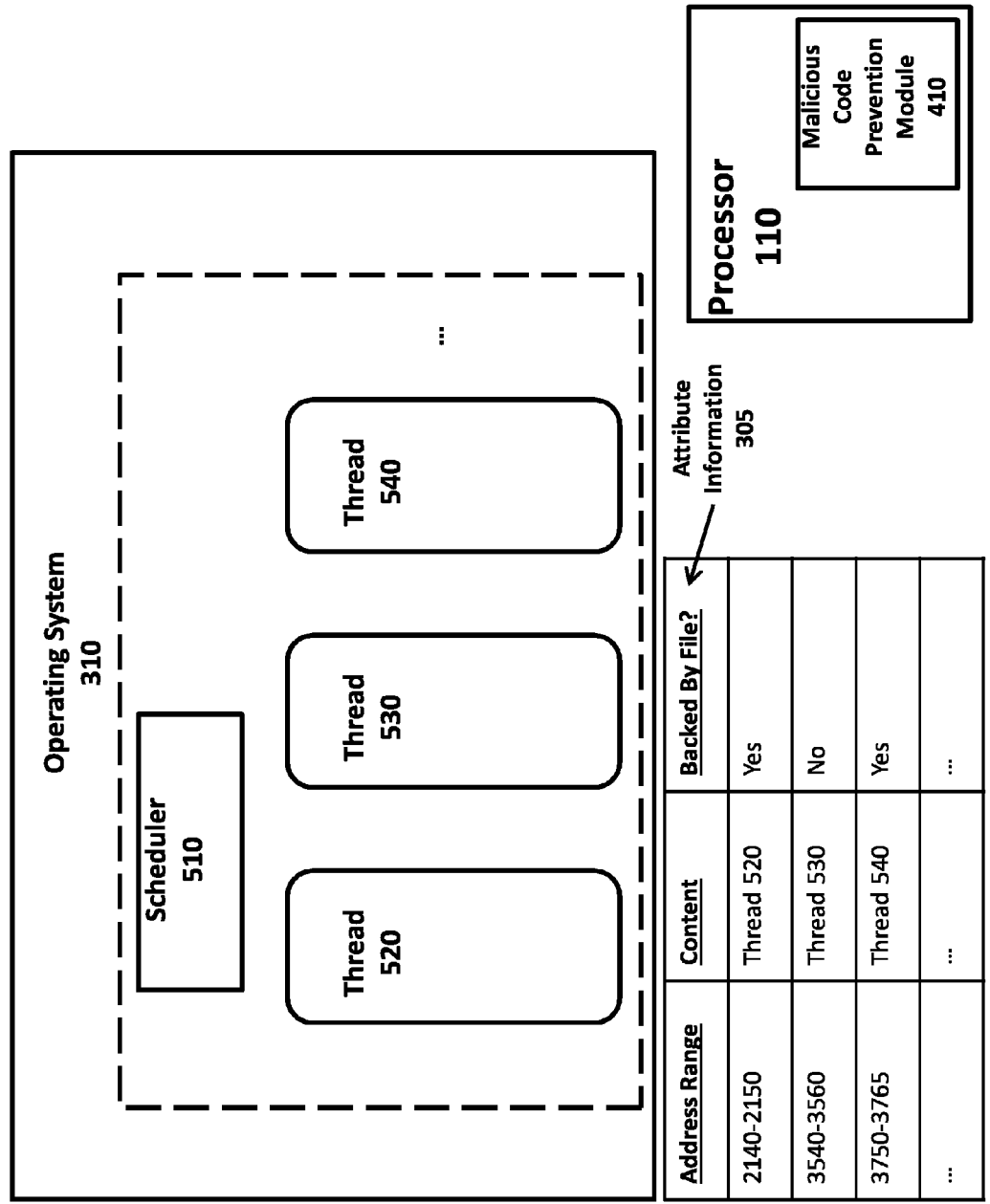
FIG. 6 depicts the malicious code prevention module identifying a potentially malicious thread within an operating system.

In another aspect of the invention, malicious code prevention module 410 determines whether each thread that is about to be executed within operating system 310 is backed by a file using attribute information 305. In FIG. 6, malicious code prevention module 410 identifies thread 530 as not backed by a file. It is likely that thread 530 is malicious code.

Figure 7:
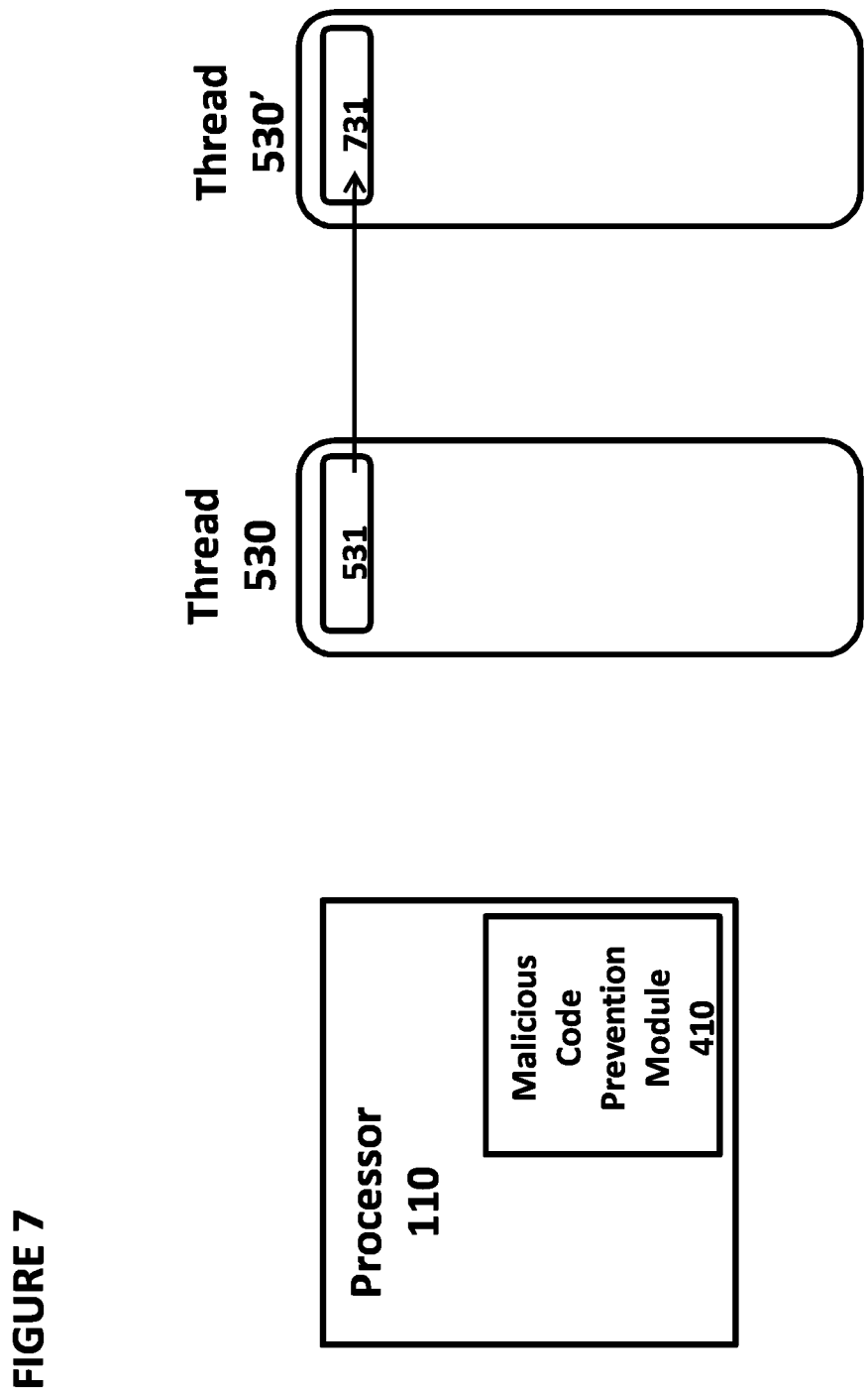
FIG. 7 depicts the malicious code prevention module replacing the first instruction in a potentially malicious thread with a new instruction that terminates the thread.

In FIG. 7, malicious code prevention module 410 replaces the first instruction 531 (or, in some instances, series 531 of instructions if it is unsafe to terminate the thread within the span of one instruction) in thread 530 with a new instruction 731 (or, in some instances, series 731 of instructions), which modifies thread 530 into thread 530'. New instruction 731 is an innocuous instruction, such as return instruction, that terminates thread 530'. Thus, malicious code prevention module 410 prevents thread 530 from being executed. In situations where thread 530 is in fact malicious, malicious code prevention module 410 will prevent the malicious code from inflicting any harm on computing device 100 and its contents.

In the above embodiments, malicious code prevention module 410 comprises lines of code executable by processor 110. Malicious code prevention module 410 optionally can be part of the kernel of operating system 310 or can be given special privileges by operating system 310 (such as the ability to access attribute information 305 and/or to replace a thread's instructions within the underlying program's address space in memory before they are executed).

Figure 8:
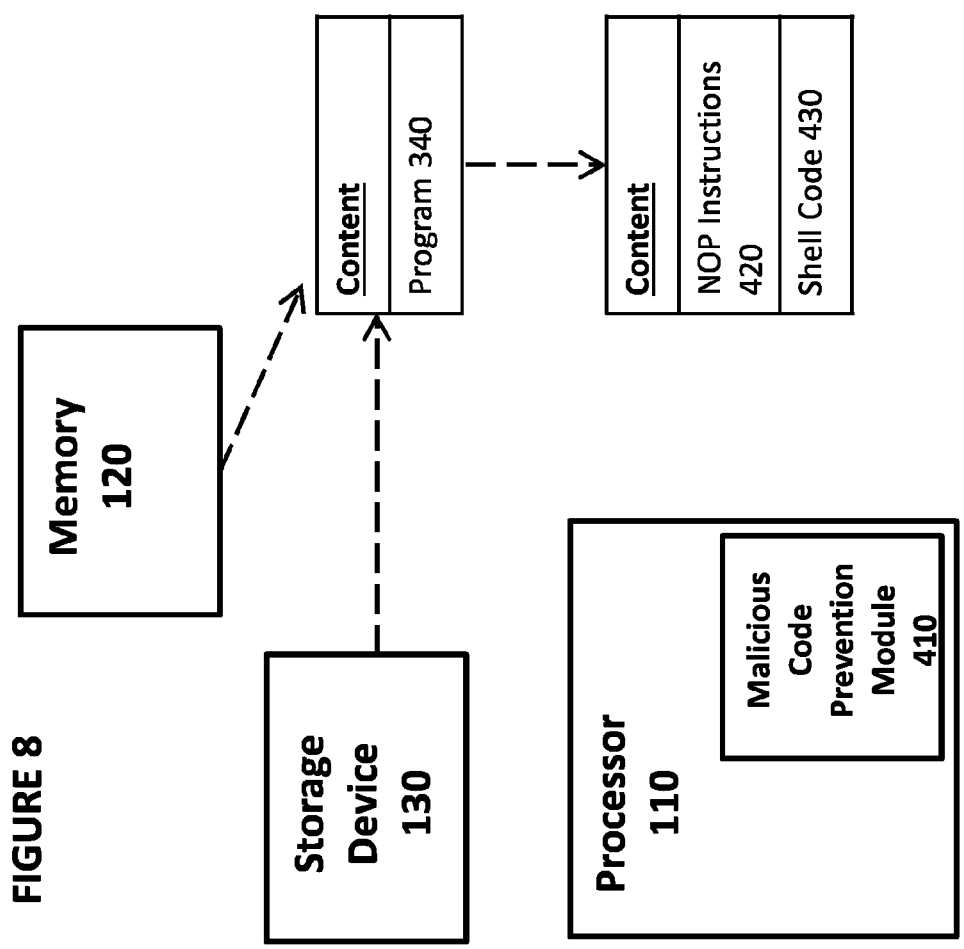
FIG. 8 depicts the malicious code prevention module replacing all or part of a set of potentially malicious instructions in memory that is backed by a file and optionally replacing all or part of the set of potentially malicious instructions in a storage device with innocuous instructions.

In another embodiment shown in FIG. 8, a malicious program 340 of instructions is backed by a file stored in storage device 130. In this embodiment, another module (not shown) determines that program 340 is malicious. An example of such module includes prior art antivirus software or code that detects the lack of a digital signature or performs outlier detection or the presence of other suspicious behavior. When program 340 is loaded into memory and is determined to be malicious, the same sequence described as to FIG. 4 is performed. Specifically, malicious code prevention module 410 replaces the program 340 of instructions with one or more No Operation (NOP) instructions and shell code, thereby preventing execution of the program of instructions by the processor. However, in addition, malicious code prevention module 410 replaces all or part of the program 340 stored in memory 120, and optionally, in storage device 130 with one or more No Operation (NOP) instructions and shell code, thereby completely preventing execution of the program of instructions by the processor in the future.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements, and procedures which, although not explicitly shown or described herein, embody the principles of the disclosure and can be thus within the spirit and scope of the disclosure. Various different exemplary embodiments can be used together with one another, as well as interchangeably therewith, as should be understood by those having ordinary skill in the art. In addition, certain terms used in the present disclosure, including the specification, drawings and claims thereof, can be used synonymously in certain instances, including, but not limited to, for example, data and information. It should be understood that, while these words, and/or other words that can be synonymous to one another, can be used synonymously herein, that there can be instances when such words can be intended to not be used synonymously. Further, to the extent that the prior art knowledge has not been explicitly incorporated by reference herein above, it is explicitly incorporated herein in its entirety. All publications referenced are incorporated herein by reference in their entireties.

The invention claimed is:

1. A method of preventing a program of instructions from being executed in a computer system comprising a processor, memory, and a non-volatile storage device, the method comprising:
   loading the program of instructions into memory;
   determining if the program of instructions is backed by a file stored in the non-volatile storage device and is executable by the processor; and
   if the program of instructions is not backed by a file stored in the non-volatile storage device or is not executable, identifying the program of instructions as potentially malicious and replacing the program of instructions with one or more No Operation (NOP) instructions and shell code, thereby preventing execution of the potentially malicious program of instructions by the processor.

2. The method of claim 1, wherein if the program of instructions is backed by a file stored in the non-volatile storage device and is executable, executing the program of instructions by the processor.

3. The method of claim 1, wherein the determining step comprises obtaining attribute information from an operating system running on the processor.

4. The method of claim 1, further comprising: executing the shell code by the processor to place the processor into a safe state.

5. The method of claim 2, wherein the determining step comprises obtaining attribute information for the program of instructions from an operating system running on the processor.

6. The method of claim 2, further comprising: executing the shell code by the processor to place the processor into a safe state.

7. A non-transitory computer-readable medium containing instructions for causing a processor to perform the following steps:
   determine if a program of instructions in memory is backed by a file stored in the non-volatile storage device and is executable by the processor;

if the program of instructions is not backed by a file stored in the non-volatile storage device or is not executable, identify the program of instructions as potentially malicious and replace the program of instructions with one or more No Operation (NOP) instructions and shell code, thereby preventing execution of the potentially malicious program of instructions by the processor; and if the program of instructions is backed by a file stored in the non-volatile storage device and is executable, allow the processor to execute the program of instructions.

8. A method of preventing a program of instructions from being executed in a computer system comprising a processor, memory, and a non-volatile storage device, the method comprising:

loading the program of instructions into memory;

determining if the program of instructions is malicious;

determining if the program of instructions is backed by a file stored in the non-volatile storage device; and if the program of instructions is not backed by a file stored in the non-volatile storage device, identifying the program of instructions as potentially malicious and replacing the program of instructions with one or more No Operation (NOP) instructions and shell code, thereby preventing execution of the potentially malicious program of instructions by the processor.

9. The method of claim 8, further comprising: replacing all of part of the file stored in the non-volatile storage device with one or more No Operation (NOP) instructions and shell code.

* * * * *